United States Patent
Hatsuda et al.

(10) Patent No.: US 6,174,978 B1
(45) Date of Patent: Jan. 16, 2001

(54) PRODUCTION PROCESS OF WATER-ABSORBENT RESIN

(75) Inventors: Takumi Hatsuda, Takasago; Takashi Namba, Suita; Yoshihiro Motono, Himeji, all of (JP)

(73) Assignee: Nippon Shokubai Co., Ltd., Osaka (JP)

(*) Notice: Under 35 U.S.C. 154(b), the term of this patent shall be extended for 0 days.

(21) Appl. No.: 09/197,220

(22) Filed: Nov. 20, 1998

(30) Foreign Application Priority Data

Dec. 10, 1997 (JP) .................................................. 9-340030

(51) Int. Cl.⁷ .................................................. C08F 30/04
(52) U.S. Cl. ................ 526/240; 526/317.1; 526/318.43; 526/318.5; 422/138
(58) Field of Search ............................. 526/68, 70, 240, 526/317.1, 318.43, 318.5; 422/138; 203/49

(56) References Cited

U.S. PATENT DOCUMENTS

| | | |
|---|---|---|
| 4,552,938 | 11/1985 | Mikita et al. . |
| 4,555,384 * | 11/1985 | Morris et al. .................. 422/109 |
| 4,654,393 | 3/1987 | Mikita et al. . |
| 4,703,067 | 10/1987 | Mikita et al. . |
| 4,857,610 | 8/1989 | Chmelir et al. . |
| 4,893,999 | 1/1990 | Chmelir et al. . |
| 4,985,518 | 1/1991 | Alexander et al. . |
| 5,145,906 | 9/1992 | Chambers et al. . |
| 5,380,808 | 1/1995 | Sumiya et al. . |

FOREIGN PATENT DOCUMENTS

| | | |
|---|---|---|
| 32 39 476 | 5/1983 | (DE) . |
| 0 303 518 | 2/1989 | (EP) . |
| 0 496 067 A2 * | 7/1992 | (EP) . |
| 0 496 067 | 7/1992 | (EP) . |
| 62-156102 | 7/1987 | (JP) . |
| 1-126310 | 5/1989 | (JP) . |
| 3-174414 | 7/1991 | (JP) . |
| 4-175319 | 6/1992 | (JP) . |
| 4-236203 | 8/1992 | (JP) . |

* cited by examiner

Primary Examiner—David W. Wu
Assistant Examiner—R. Harlan

(57) ABSTRACT

The invention provides a production process of a water-absorbent resin, by which process the polymerization temperature can be controlled in static aqueous solution polymerization. The production process of a water-absorbent resin comprises the step of polymerizing statically an aqueous solution with a thickness of 10–50 mm including a hydrophilic monomer, and is characterized in that the polymerization heat is removed using both cooling due to heat conduction transfer and cooling due to the latent heat of vaporization, thereby controlling the maximum attained temperature of the polymerization system in the range of 60–95°C. or controlling the increase in solid content in the range of 0.2 to 10 weight %.

39 Claims, 1 Drawing Sheet

PRODUCTION PROCESS OF WATER-ABSORBENT RESIN

BACKGROUND OF THE INVENTION

A. Technical Field

The present invention relates to a production process of a water-absorbent resin, more particularly, a production process of a water-absorbent resin by polymerizing statically an aqueous solution including a hydrophilic monomer.

B. Background Art

In recent years, in the fields of sanitary materials and so on such as paper diapers, physiological napkins and so-called incontinent pads, a water-absorbent resin is widely used as the object of absorbing body fluids.

As to the above water-absorbent resin, the following materials are, for example, known: crosslinked products of partially neutralized polyacrylic acid, hydrolysis products of starch-acrylonitrile graft polymer, neutralized products of starch-acrylic acid graft polymer, saponified products of vinyl acetate-acrylic acid ester copolymer, hydrolysis products of acrylonitrile copolymer or acrylamide copolymer or their crosslinked products, crosslinked products of cationic monomer.

As a production process of these water-absorbent resins, a process of carrying out an aqueous solution polymerization while stirring an aqueous solution including a hydrophilic monomer of which the main component is acrylic acid or its salt is generally employed.

As for the stirring polymerization, because the polymerization can be carried out while cutting to little pieces a hydrogel polymer generated with the progress of the polymerization, this is excellent in that polymerization in which the polymerization peak temperature is controlled to some extent can be carried out by removing the polymerization heat with a relatively compact apparatus. However, because molecular chains are cut due to the shear force of the stirring, there are such problems that the molecular weight is hardly raised and that the network of the crosslinking structure is apt to fall into disorder. In comparison with this process, by a process of polymerizing statically an aqueous monomer solution without stirring, as is suggested in JP-A-62-156102, JP-A-01-126310, JP-A-03-174414, JP-A-04-175319, JP-A-04-236203 and so on, the water-absorbent resin is obtained without problems mentioned above.

However, in the conventional static aqueous solution polymerization, because the polymerization temperature cannot be controlled, the maximum attained temperature of the polymerization system exceeds 110° C. Therefore, the water-soluble content, which is undesirable for the water-absorbent resin, is increased, so only the water-absorbent resin of low physical properties can be obtained. Or, to control the maximum attained temperature, it is necessary to lower the concentration of the aqueous monomer solution, so it is unavoidable to employ production processes of low productivity.

SUMMARY OF THE INVENTION

A. Object of the Invention

It is an object of the present invention to solve the above-mentioned problems and to provide a production process by which the polymerization temperature can be controlled in the static aqueous solution polymerization, and a water-absorbent resin of excellent quality can be obtained with high productivity.

B. Disclosure of the Invention

The present inventors studied with encouragement to themselves and great efforts the cause why the polymerization temperature cannot be controlled in the static aqueous solution polymerization, considering that the stirring polymerization does not have such a problem. As a result, it was found that in the stirring polymerization, because the surface area of the water-absorbent resin becomes large due to stirring, much polymerization heat is taken away by the latent heat of vaporization, so the polymerization temperature is controlled naturally. Then the present inventors thought that, similarly in the static polymerization, the removal of the polymerization heat should be sufficiently carried out using together the cooling due to the heat conduction transfer from a contact face with the polymerization system and the cooling due to the latent heat of vaporization which is caused by evaporation of a solvent from the polymerization system. "Heat conduction transfer" means the transfer of heat from polymerization through a conducting medium without perceptible motion of the medium itself. Cooling due to heat conduction transfer means cooling by keeping the surface of a cooling apparatus in contact with a polymerization system at a temperature in the range of 0 to 30° C. "Latent heat of vaporization" means the quantity of heat released from polymerization by an aqueous solution undergoing a change of state from liquid to vapor. Cooling due to the latent heat of vaporization means facilitating vaporization of solvent from the polymerization system by removing vapor collected in the upper space of a polymerization system. Facilitating vaporization of solvent means facilitating a transformation of energy where 1) heat energy generated in the polymerization reaction is changed into 2) energy used for phase transition of the solvent, which may also be referred to as the energy of the latent heat of vaporization. As a result of cooling due to latent heat of vaporization, an increase in temperature by an exothermic reaction of the reaction system can be suppressed. Thus, the inventors achieved the present invention.

To solve the above problems, the present invention has the below constitution.

(1) A production process of a water-absorbent resin, comprising the step of polymerizing statically an aqueous solution with a thickness of 10~50 mm including a hydrophilic monomer, characterized in that the maximum attained temperature of the polymerization system is controlled in the range of 60~95° C. in the way to remove the polymerization heat by using both cooling due to heat conduction transfer and cooling due to the latent heat of vaporization.

(2) A production process of a water-absorbent resin, comprising the step of polymerizing statically an aqueous solution with a thickness of 10~50 mm including a hydrophilic monomer, characterized in that the increase in solid content of from the aqueous solution including the hydrophilic monomer to a hydrogel polymer that will form after going through the maximum attained temperature of the polymerization system is controlled in the range of 0.2 to 10 weight % in the way to remove the polymerization heat by using both cooling due to the heat conduction transfer and cooling due to the latent heat of vaporization.

These and other objects and the advantages of the present invention will be more fully apparent from the following detailed disclosure.

DETAILED DESCRIPTION OF THE INVENTION

Figure 1:
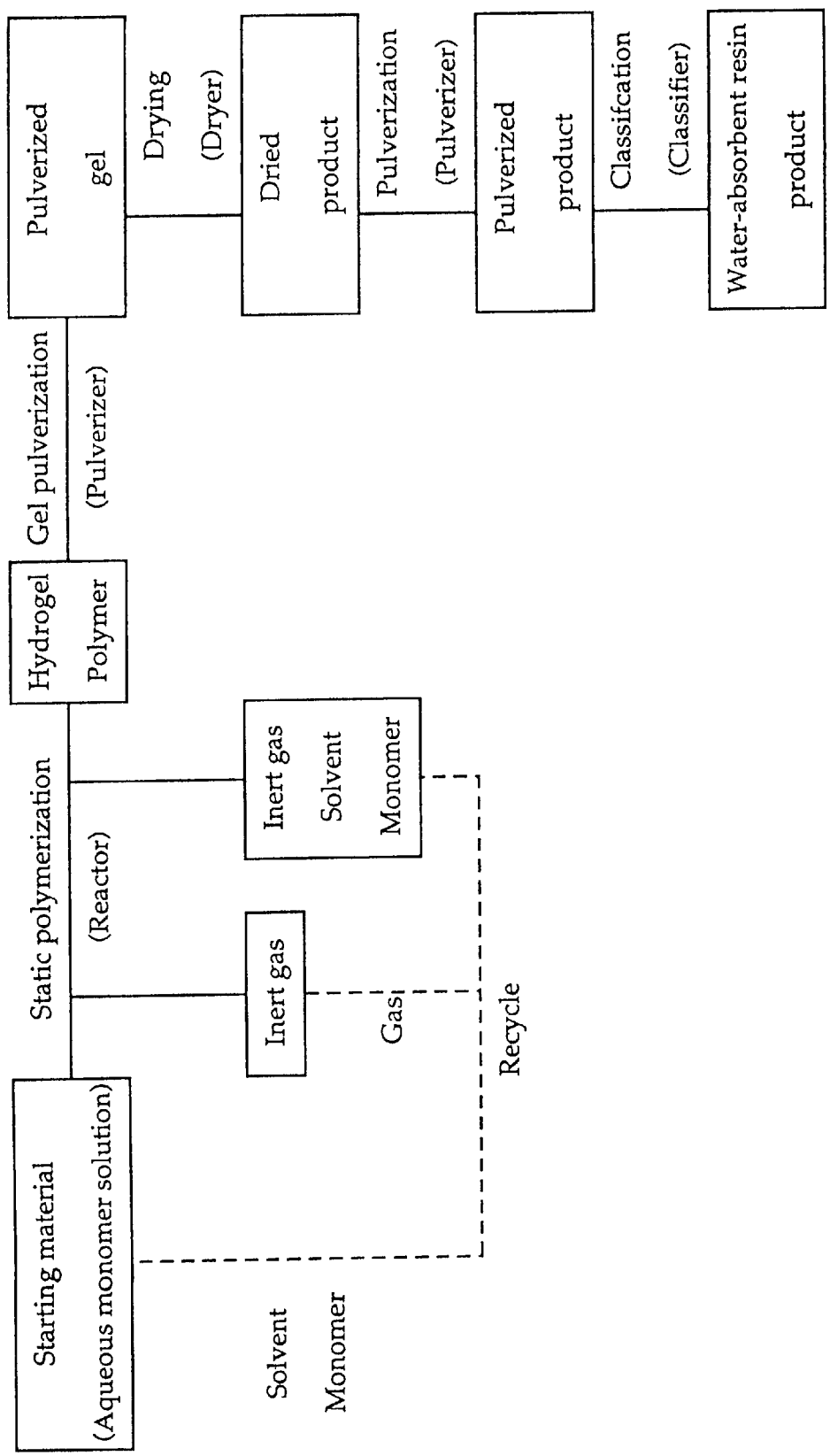
FIG. 1 is a flow chart showing an example of the flow of the production process to produce a water-absorbent resin in accordance with the present invention.

The hydrophilic monomer used in the present invention is not limited providing that it can become a water-absorbent resin due to polymerization, but examples thereof include: anionic unsaturated monomers and their salts such as acrylic acid, methacrylic acid, maleic acid, vinylsulfonic acid, styrenesulfonic acid, 2-(meth)acrylamido-2-methylpropanesulfonic acid, 2-(meth)acryloylethanesulfonic acid and 2-(meth)acryloylpropanesulfonic acid; nonionic unsaturated monomers including a hydrophilic group such as acrylamide, methacrylamide, N-ethyl(meth)acrylamide, N-n-propyl(meth)acrylamide, N-isopropyl (meth) acrylamide, N,N-dimethyl(meth)acrylamide, 2-hydroxyethyl (meth)acrylate, 2-hydroxypropyl (meth) acrylate, methoxypolyethylene glycol (meth)acrylate, polyethylene glycol mono(meth)acrylate, vinylpyridine, N-vinylpyrrolidone, N-acryloylpiperidine and N-acryloylpyrrolidine; and cationic unsaturated monomers such as N,N-dimethylaminoethyl (meth)acrylate, N-diethylaminoethyl (meth)acrylate, N,N-dimethylaminopropyl (meth)acrylate, N,N-dimethylaminopropyl(meth)acrylamide and their quaternary salts. One kind or two kinds or more of these can be used.

Among these, it is preferable that acrylic acid or its salt is used as the main component, and the used amount of monomers other than acrylic acid or its salt is, usually, preferably in the range of 0~50 mol % (but not including 50 mol %), more preferably, 0~30 mol %, of the whole monomers.

The concentration of the aqueous solution of the hydrophilic monomer is generally variable throughout the wide range, but is preferably in the range of 10~60 weight %, more preferably 20~50 weight %, and still more preferably 20~45 weight %. When the concentration is less than 10 weight %, the productivity is bad and the conversion is hardly raised and monomers which are not reacted are increased. When the concentration exceeds 60 weight %, it is difficult to control the polymerization temperature in the static polymerization, and the resultant water-absorbent resin is inferior in the absorption capacity and/or in the water-soluble content.

When the polymerization is carried out, the following materials may be added: hydrophilic polymers such as starch-cellulose, derivatives of starch-cellulose, polyvinyl alcohol, polyacrylic acid (salt) and crosslinked products of polyacrylic acid (salt); and chain transfer agents such as hypophosphorous acid (salt).

In the present invention, it is preferable that the water-absorbent resin has a crosslinked structure. Its examples are as follows: self-crosslinking types using no crosslinking agent; and copolymerized or reacted types of internal-crosslinking agents which have two or more polymerizable unsaturated groups or two or more reactive groups. A preferable one is a water-absorbent resin which has a crosslinked structure as formed by copolymerizing or reacting the internal-crosslinking agent with a hydrophilic unsaturated monomer.

Concrete examples of these internal-crosslinking agents include: N,N'-methylenebis(meth)acrylamide, (poly) ethylene glycol di(meth)acrylate, (poly)propylene glycol di(meth)acrylate, trimethylolpropane tri(meth)acrylate, trimethylolpropane di(meth)acrylate, glycerol tri(meth) acrylate, glycerol acrylate methacrylate, ethylene-oxide-denatured trimethylolpropane tri(meth)acrylate, pentaerythritol tetra(meth)acrylate, dipentaerythritol hexa (meth)acrylate, triallyl cyanurate, triallyl isocyanurate, triallyl phosphate, triallylamine, poly(meth)allyloxyalkane, (poly)ethylene glycol diglycidyl ether, glycerol diglycidyl ether, ethylene glycol, polyethylene glycol, propylene glycol, glycerol, pentaerythritol, ethylenediamine, polyethylenimine and glycidyl (meth)acrylate. Also, these internal-crosslinking agents may be used either alone or in combinations with each other.

The used amount of the internal-crosslinking agent is preferably in the range of 0.005~3 mol %, more preferably 0.01~1.5 mol %, of the above monomer component. When the amount of the internal-crosslinking agent is too small, the absorbing speed is apt to fall. Inversely, when the amount of the internal-crosslinking agent is too large, the absorption capacity is apt to fall.

Also, when the polymerization is carried out, the following can be used: radical polymerization initiators such as potassium persulfate, ammonium persulfate, sodium persulfate, t-butyl hydroperoxide, hydrogen peroxide and 2,2'-azobis(2-amidinopropane) dihydrochloride; and activation energy beams such as ultraviolet and electron beam. Also, when the oxidizable radical polymerization initiator is used, redox polymerization may be carried out by the joint use with reducing agents such as sodium sulfite, sodium hydrogen sulfite, ferrous sulfate and L-ascorbic acid. The used amount of these polymerization initiators is usually in the range of 0.001~2 mol %, preferably 0.01~0.5 mol %. These polymerization initiators and activation energy beams may be used together.

Especially, a water-absorbent resin with excellent absorbency might be obtained by jointly using the following four types polymerization initiators: an azo compound, an inorganic peroxide, a reducing agent, and hydrogen peroxide. In this case, hydrogen peroxide is not included in the inorganic peroxide. Because the azo compound is a thermal cracking type polymerization initiator, it acts after the temperature of the polymerization system has risen to a certain temperature or higher. Because the inorganic peroxide and hydrogen peroxide are both oxidizable polymerization initiators, they act as a redox initiator in combination with the reducing agent or as a thermal cracking type initiator alone. The redox initiator mainly acts in a low temperature region in the initial stage of polymerization. If the inorganic peroxide is used, the amount of monomer remaining after polymerization can be decreased.

Examples of the above azo compound include 2,2'-azobis (N,N'-dimethyleneisobutylamide) dihydrochloride, 2,2'-azobis(2-amidinopropane) dihydrochloride, 2,2'-azobis(N, N'-dimethyleneisobutylamide), 4,4'-azobis(4-cyanopentanoic acid), and azobisisobutyronitrile. Examples of the above inorganic peroxide include sodium persulfate, potassium persulfate, and ammonium persulfate. Examples of the above reducing agent include sulfites of alkaline metals, bisulfites of alkaline metals, ammonium sulfite, ammonium bisulfite, ascorbic acid, and erythorbic acid. The combination of 2,2'-azobis(2-amidinopropane) dihydrochloride, sodium persulfate, L-ascorbic acid, and hydrogen peroxide is preferable.

The amount of the above polymerization initiator as used is preferably in the range of 0.001 to 0.1 mol % for the azo compound, 0.001 to 0.1 mol % for the inorganic peroxide, 0.0001 to 0.01 mol % for the reducing agent, and 0.001 to 0.01 mol % for hydrogen peroxide, relative to the above monomer component. For decreasing the amount of monomer remaining after polymerization, it is preferable that the total amount of the inorganic peroxide and hydrogen peroxide is larger than the amount of the reducing agent.

The order of adding the above four types polymerization initiators is preferably such that the addition of hydrogen peroxide is final. When hydrogen peroxide is added prior to the other polymerization initiators, not only does the polymerization become unstable, but also stable physical properties of the product cannot be obtained, so the resultant water-absorbent resin merely has low ability.

The polymerization initiation temperature can be fitly selected and is usually in the range of 0~50° C., preferably 10~40° C., and more preferably 15~30° C.

The maximum attained temperature of the polymerization system is preferably in the range of 60~95° C., more preferably 70~90° C., and still more preferably 75~90° C. When the temperature is lower than 60° C., the absorption capacity of the obtained water-absorbent resin becomes small, or the amount of monomer which is not reacted becomes large. On the other hand, when the temperature exceeds 95° C., the water-soluble content of the obtained water-absorbent resin becomes large and this is not preferable.

The temperature difference in the polymerization system (mainly the temperature difference in thickness directions, especially the temperature difference in a region near the maximum attained temperature) is preferably within 30° C. and more preferably within 25° C. When the temperature difference in the polymerization system is too large, the qualities of the resultant water-absorbent resin are different at different positions, so not only are physical properties unstable, but also the quality of the entirety becomes bad.

The polymerization heat involved by the polymerization is removed by using together the cooling due to the heat conduction transfer from a contact face with the polymerization system and the cooling due to the latent heat of vaporization which is caused by evaporation of a solvent, mainly such as water, from the polymerization system. In the present invention, it is important to use together the cooling due to the latent heat of vaporization and the cooling due to the heat conduction transfer and, by such joint use, the polymerization temperature can controlled while minimizing the polarization of the temperature between positions in the polymerization system. As a result, the water-absorbent resin with high absorption capacity and little water-soluble content can stably be obtained.

The cooling due to the latent heat of vaporization is to remove the heat from the polymerization system mainly by vaporizing water from the polymerization system (aqueous monomer solution and/or resultant hydrogel polymer). The vaporization amount of water is preferably in the range of 0.5~10 weight %, more preferably 1~5 weight %, of the aqueous monomer solution. When the vaporization amount of water is less than 0.5 weight %, the temperature control of the polymerization system cannot sufficiently be carried out and the maximum attained temperature becomes high and the water-soluble content is increased. On the other hand, when the vaporization amount of water exceeds 10 weight %, the absorption capacity of the obtained water-absorbent resin is apt to become small.

The amount of vaporization of, for example, water, monomer, from the aqueous monomer solution and/or the resultant hydrogel polymer is herein determined as a ratio of the total amount of water vapor and monomer, which have vaporized from the polymerization system since the polymerization gets started until the polymerization system is separated as the resultant hydrogel polymer after going through the maximum attained temperature, (Y kg) to the amount of the aqueous monomer solution charged (X kg), namely, 100Y/X (weight %). In the case of continuous polymerization, the respective amounts per unit time may be determined.

On the other hand, there is the increase in solid content as the amount that is proportional to the above amount of vaporization. In the present invention, the increase in solid content is determined as follows:

(1) After the polymerization system has reached the maximum attained temperature, the solid content of the resultant hydrogel polymer (A weight %) is determined. This solid content can be determined by pulverizing the hydrogel polymer into a particle size of 2 mm or less, and then placing 2~3 g (W0 g) of the pulverized polymer into an aluminum cup (W1 g) with a diameter of 5 cm, and then keeping this cup in a no-wind drying machine of 180° C. for 5 hours, and then measuring the weight of the cup (W2 g). That is to say, A=100(W2−W1)/W0.

(2) Next, the difference between the hydrophilic monomer concentration in the aqueous solution of the hydrophilic monomer and the above-determined A weight % is determined. That is to say, A-B (weight %) is the increase in solid content. The increase in solid content, in the present invention that effectively utilizes the cooling due to the latent heat of vaporization, is preferably in the range of 0.2 to 10 weight %, more preferably 0.3 to 5 weight %, and still more preferably 0.5 to 5 weight %. When the increase in solid content is less than 0.2 weight %, the temperature of the polymerization system cannot sufficiently be controlled, and the maximum attained temperature becomes high, and the water-soluble content becomes great. On the other hand, when the increase in solid content is more than 10 weight %, the absorption capacity of the resultant water-absorbent resin tends to be small.

The static polymerization in the present invention is preferably carried out using a polymerization apparatus that can get the polymerization system airtight. The polymerization can be carried out under increased or decreased pressure in a predetermined gas atmosphere in a state where air is discharged using the above apparatus. In such a case, as an operation of taking out the latent heat of vaporization, it is preferable to introduce 30 cm/min or more of an inert gas to the upper side of the polymerization system. The range of 30~6000 cm/min is preferable and the range of 50~3000 cm/min is more preferable. The introducing amount smaller than 30 cm/min results in insufficient cooling effect and increases the water-soluble content of the obtained water-absorbent resin. Incidentally, also in conventional processes, the polymerization under nitrogen current is carried out. However, its object is to prevent the amount of dissolved oxygen in the monomer from increasing, so the introducing amount is at most about 20 cm/min. In comparison with this, the flow rate which exceeds it largely is necessary for carrying out positively the temperature control of the polymerization system due to the latent heat of vaporization. The humidity of the inert gas, flowed to the upper portion of the polymerization system, is preferably 80% or less, and more preferably 50% or less. Examples of the inert gas include: nitrogen gas, argon, helium, carbonic acid gas and superheating steam. Because the polymerization heat is, generally, not generated largely until the temperature of the polymerization system reaches 40° C. or higher, the inert gas for removing the polymerization heat by utilizing the latent heat of vaporization does not have to be flowed until the temperature of the polymerization system reaches 40° C. or higher. However, this does not exclude the inert gas from being introduced for the purpose of lowering the amount of dissolved oxygen in the polymerization system below that temperature.

As another operation of taking out the latent heat of vaporization, it is preferable to make dewfall of water vapor in ambient gas which contacts the polymerization system. This is possible by cooling a contact face with the ambient gas. The contact face of a polymerization reaction machine with the ambient gas may be cooled, or the ambient gas may be sucked and the gas from which the condensed water has been removed by passing through a cooling tower may be returned to the polymerization machine again to mix it with a fresh gas and then recycle the resultant mixture. In addition, because the condensed water is an aqueous solution of the hydrophilic monomer which contains not only water but also the hydrophilic monomer, at least part (for example, 5 weight % or more) of the condensed water may be recycled to a starting aqueous solution including the hydrophilic monomer. The latent heat of vaporization can be taken out by decompressing the polymerization system (to 760 mmHg or below), too.

To efficiently carry out the cooling due to the heat conduction transfer, it is preferable to set the temperature of the contact face with the polymerization system to be 0~30° C. When this temperature is below 0 ° C., a special means to achieve the temperature is necessary and this is not practical. When the above temperature is higher than 30° C., the removal of the polymerization heat due to the heat conduction transfer cannot be sufficiently carried out.

The ratio between the cooling due to the heat conduction transfer and the cooling due to the latent heat of vaporization is not especially limited. However, it is preferable that 20~60% of the polymerization heat is removed due to the latent heat of vaporization.

The thickness of the polymerization system (a liquid height of the aqueous hydrophilic monomer solution) is in the range of 10~50 mm and is preferably in the range of 10~40 mm and is more preferably in the range of 15~35 mm. When the thickness of the polymerization system is less than 10 mm, the productivity is low. Also, in the thickness like this, it is possible to control the temperature of the polymerization system in the desired range only by the cooling due to the heat conduction transfer, even without utilizing the latent heat of vaporization. On the other hand, when the thickness of the polymerization system exceeds 50 mm, it is difficult to control the temperature of the polymerization system, so the maximum attained temperature exceeds 95° C., and the water-soluble content of the obtained water-absorbent resin is increased.

In the present invention, the polymerization is carried out by a static polymerization. The static polymerization is a polymerization that is carried out substantially without stirring since the start of the polymerization until the polymerization system reaches the maximum attained temperature due to the polymerization heat.

A polymerization apparatus used in the static polymerization is not especially limited providing that it can carry out heating and/or cooling of the contact face with the polymerization system and has a space in which the solvent can evaporate from the polymerization system. Examples of such a polymerization apparatus include: a belt conveyor type polymerization apparatus to carry out heating and/or cooling from the lower one side of the belt conveyor: a heat exchanging plate type polymerization apparatus to carry out heating and/or cooling from one side of the plate; a centrifugal thin-film type polymerization apparatus to carry out heating and/or cooling from the surrounding walls.

Examples of materials of the polymerization apparatus include stainless steel, synthetic resin, and ceramics, but are not especially limited. However, the stainless steel is preferable in that it is excellent in durability and heat transfer ability.

In the present invention, if necessary, there may be provided a maturing step in which after the polymerization system has reached the maximum attained temperature, the temperature of the heat transfer face is raised to 50° C. or higher and the hydrogel polymer is thermally insulated and/or is heated. The maturing step can be provided by setting the hydrogel polymer for 10 minutes~10 hours in the range of 30~95° C., preferably for 20 minutes~5 hours in the range of 40~90° C. By providing the above maturing step, the amount of monomers which are not reacted can be decreased.

The hydrogel polymer obtained by the above-mentioned polymerization can be pulverized to dry it, thus obtaining a particulate hydrogel polymer (pulverized gel) having an average particle diameter of about 1 to about 10 mm.

The apparatus used to pulverize the gel in the above way is not especially limited providing that it can pulverize a block- or sheet-shaped hydrogel polymer into a predetermined size, and its examples include: meat choppers (made by Hiraga Kosakusho & Co., Ltd. and so on), kneaders, pulverizers (such as cutter mills, and shred crushers), and slitters which have cutter edges.

For drying the above pulverized gel, conventional drying machines and heating furnaces can be used. The followings are, for example, used: thin type agitation drying machines, rotation drying machines, disk drying machines, fluidized bed drying machines, air current drying machines, and infrared drying machines. On that occasion, the drying temperature is preferably in the range of 40 to 250° C., more preferably 90 to 200° C., and still more preferably 120 to 180° C. The drying duration is, usually, preferably in the range of 1 to 180 minutes, and more preferably in the range of 10 to 120 minutes. The dried product obtained in this way usually has a solid content of 70 to 100 weight %, preferably 80 to 98 weight %, as determined in the same way as to determine the solid content in the above hydrogel polymer.

The dried product itself, obtained by the above drying, may be used as a water-absorbent resin, but is further pulverized and classified to be used as a particulate water-absorbent resin of the predetermined size. On that occasion, the particle size is usually in the range of 10 $\mu$m to 5 mm and preferably in the range of 100 $\mu$m to 1 mm. Depending on the usage, the average particle diameter is usually in the range of 100 to 1,000 $\mu$m and preferably in the range of 150 to 800 $\mu$m.

The vicinity of the surface of the above particulate water-absorbent resin may further be subjected to a crosslinking treatment and, by this treatment, a water-absorbent resin which has a high absorption capacity under a load can be obtained. For the surface-crosslinking treatment, a crosslinking agent which can react with functional groups which the water-absorbent resin has, for example, a carboxyl group, may be used, and conventional crosslinking agents which are usually used in that usage are exemplified.

As to the surface-crosslinking agent, the following materials are, for example, listed: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethyleneoxypropylene block copolymer, pentaerythritol and sorbitol; polyvalent epoxy compounds such as ethylene glycol diglycidyl ether, polyethylene diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyvalent amine compounds and their inorganic salts and organic salts (for example, azetidinium salts), such as ethylenediamine, diethylenetriamine, triethylenetetramine, tetraethylenepentamine, pentaethylenehexamine and polyethylenimine; polyvalent isocyanate compounds such as 2,4-tolylene diisocyanate and hexamethylene diisocyanate; polyvalent oxazoline compounds such as 1,2-ethylenebisoxazoline; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one and 1,3-dioxopan-2-one; haloepoxy compounds and their polyvalent amine adducts (for example, Kymene made by Hercules: registered trademark) such as epichlorohydrin, epibromohydrin and α-methylepichlorohydrin; polyvalent metallic compounds such as hydroxides and chlorides of zinc, calcium, magnesium, aluminum, iron and zirconium. Among these, polyhydric alcohol compounds, polyvalent epoxy compounds, and polyvalent amine compounds and their salts, and alkylene carbonate compounds are preferable. These surface-crosslinking agents may be used either alone or in combinations with each other.

The amount of the surface-crosslinking agent is preferably in the range of 0.01~10 weight parts, more preferably 0.5~5 weight parts, per 100 weight parts of the water-absorbent resin.

For the heating treatment to react the surface-crosslinking agent and the water-absorbent resin, conventional drying machines and heating furnaces can be used. The followings are, for example, used: thin type agitation drying machines, rotation drying machines, disk drying machines, fluidized bed drying machines, air current drying machines, and infrared drying machines. In that case, the temperature of the heating treatment is preferably in the range of 40~250° C., more preferably 90~230° C. and still more preferably 120~220° C. The duration of the heating treatment is, usually, preferably in the range of 1~120 minutes and more preferably 10~60 minutes.

FIG. 1 is a flow chart showing an example of the flow of the production process to produce a water-absorbent resin in accordance with the present invention, but the invention is not limited thereto. The starting material (aqueous solution including a hydrophilic monomer) is statically polymerized in a reactor to form a hydrogel polymer. In such a process, it is preferable that an inert gas is introduced to bring out the latent heat of vaporization, and that the condensed water including vaporized solvents (such as water) and hydrophilic monomer is separated from the discharged gas and then recycled to the starting material, and that the rest of the gas is recycled as the inert gas. The resultant hydrogel polymer is pulverized to form a pulverized gel and then dried with a drying machine (and then further pulverized, if necessary) and then classified, thus forming a particulate water-absorbent resin (product).

(Effects and Advantages of the Invention):

According to the present invention, a water-absorbent resin can be produced by static aqueous solution polymerization while controlling the maximum attained temperature of the polymerization system. Accordingly, the invention can provide a water-absorbent resin of which the absorption capacity is high and of which the water-soluble content is small. Also, because the polymerization heat is removed due to the latent heat of evaporation, energy cost is low, which is economical.

Due to the above effects, the water-absorbent resin obtained by the present invention is useful for the following various industrial usages which need water absorption, water-preservation, humidity, swelling and gelation: usages which contact human body, such as sanitary materials (e.g. paper diapers for children and for adults, physiological napkins, incontinent pads); materials to separate water from oil; other dehydrating or drying agents; water-preservation materials for plants and soil; solidification agents for muddy sediment; dewfall prevention agents; water-cutoff materials for electric wires or optical fibers; water-cutoff materials for engineering works and buildings.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

In the examples, the absorption capacity and the water-soluble content are measured by the below methods. In addition, in the following, unless otherwise noted, the units "%" and "part(s)" are by weight.

[Absorption Capacity]

About 0.2 g of a water-absorbent resin was uniformly placed into a bag made of nonwoven fabric (60 mm×60 mm) and then dipped into artificial urine (comprising sodium sulfate 0.200%, potassium chloride 0.200%, magnesium chloride hexahydrate 0.050%, calcium chloride dihydrate 0.025%, ammonium dihydrogen phosphate 0.085%, diammonium hydrogen phosphate 0.015%, and deionized water 99.425 %). After 60 minutes, the bag was pulled up, and swishing water off was carried out at 250 G for 3 minutes by using a centrifuge, and the weight W1 (g) of the bag was measured. The same operation was carried out without using the water-absorbent resin, and the weight W0 (g) of the bag of that time was measured. According to the next formula, the absorption capacity (g/g) was calculated from W1 and W0.

Absorption capacity (g/g)=(W1 (g)−W0 (g))/weight of water-absorbent resin (g)

[Water-soluble Content]

First of all, 0.5 g of water-absorbent resin was dispersed into 1000 g of deionized water and, after stirring for 3 hours, filtrated with a filter paper. Next, 50 g of the obtained was placed into a 100 ml beaker, and then 1 ml of a 0.1 N aqueous sodium hydroxide solution, 10 ml of an N/200 aqueous methyl glycol chitosan solution and 4 drops of a 0.1% aqueous Toluidine Blue solution were added to the filtrate. Thereafter, a colloidal titration of the water-soluble polymer component amount (water-soluble content) in the beaker was carried out by using an N/400 aqueous potassium polyvinyl sulfate solution. The time when the color of the solution changed from blue to purplish red was regarded as the end of the titration, and the titrated amount A (ml) was measured. Also, the same operation was carried out by using 50 g of deionized water instead of 50 g of the filtrate, and the titrated amount B (ml) was measured as a blank. Then, according to the next formula, the water-soluble content was calculated from the titrated amount A, B and the average molecular weight C of the constituting monomers of the water-absorbent resin.

Water-soluble content (wt %)=(B−A)×0.01×C

EXAMPLE 1

First of all, 173 g of acrylic acid and 1424 g of a 37% aqueous sodium acrylate solution as monomers, 1.33 g of polyethylene glycol diacrylate (average molecular weight 478) as a crosslinking agent, and 388 g of water were sufficiently mixed to prepare an aqueous liquid. The obtained aqueous liquid was placed into a stainless vessel which had a size of length 320 mm×width 220 mm×height 50 mm and of which the inner surface was Teflon-coated. At that time, the thickness of the aqueous liquid was 25 mm. The stainless vessel was sealed at its upper side with a polyethylene film which had a nitrogen introducing inlet, an exhaust outlet and a polymerization initiator injecting inlet, and then the vessel was dipped into a water bath of 30° C. Dissolved oxygen was removed from the aqueous liquid by introducing a nitrogen gas into the aqueous liquid while adjusting the temperature of the aqueous liquid to 30° C. Thereafter, the nitrogen gas was introduced at 6 L/minute (108 cm/minute) in the length direction of the vessel, while the exhaust was continued from the opposite side. Then, 0.02 g/(monomer mol) of V-50 (azo-based polymerization initiator made by Wako Pure Chemical Industries, Ltd.), 0.0018 g/(monomer mol) of L-ascorbic acid and 0.0014 g/(monomer mol) of hydrogen peroxide, which were respectively dissolved in 5 g of deaerated water, were injected as polymerization initiators and sufficiently mixed with a magnetic stirrer (monomer concentration: 35.0%). Because the polymerization got started 1 minute after the injection of the polymerization initiators, the stainless vessel was dipped into a water bath of 10° C. up to the height of 10 mm from the bottom of the vessel, and the upper part of the polyethylene film was covered with a heat insulator. After 13 minutes, the polymerization peak temperature of 80° C. was exhibited. Water vapor that came out of the exhaust outlet in that polymerization period of 12 minutes was trapped and was found to be 55 g. After the polymerization peak, the stainless vessel was dipped in a water bath of 80° C. up to the height of 10 mm from the bottom of the vessel and held for 60 minutes.

The obtained hydrogel polymer was pulverized with a meat chopper (No. 32 type chopper made by Hiraga Kosakusho & Co., Ltd.) having a perforated plate (dice) containing holes of a diameter of 9.5 mm and then dried at 160° C. for 65 minutes. On the other hand, the solid content of a pulverized gel resultant from the above pulverization of the hydrogel polymer with the meat chopper was measured by the method, as described in the present specification, of measuring the solid content of the hydrogel polymer, and, as a result, gave a value of 36%, and the increase in solid content was 1%. The dried product was pulverized and classified, thereby obtaining a water-absorbent resin (1) of 500~106 μm.

The absorption capacity and the water-soluble content of the water-absorbent resin (1), as measured by the above-mentioned method, were 68 g/g and 4% respectively.

EXAMPLE 2

First of all, 43.7 kg of acrylic acid and 286 kg of a 37% aqueous sodium acrylate solution as monomers, 337 g of polyethylene glycol diacrylate (average molecular weight 478) as a crosslinking agent, and 86.3 kg of water were sufficiently mixed to prepare an aqueous liquid. The obtained aqueous liquid was supplied at 71.2 kg/h to a stainless-steel-made belt polymerization machine having a width of 30 cm and moving at 14 cm/min. In the belt polymerization machine with a dam of 50 mm in height, the aqueous liquid was filled up to the height of 25 mm. The aqueous liquid was heated on a supplying line so that the temperature of the aqueous liquid would be 22° C. at a supplying inlet of the belt polymerization machine. Also, a nitrogen gas was successively introduced on the supplying line, and dissolved oxygen was decreased to 0.5 ppm or below. To the aqueous liquid of which the dissolved oxygen level was decreased in such a way, an aqueous liquid of the below-mentioned polymerization initiators was successively injected and sufficiently mixed on the supplying line such that V-50 would be 0.02 g/(monomer mol), L-ascorbic acid would be 0.0018 g/(monomer mol), and hydrogen peroxide would be 0.0014 g/(monomer mol) (monomer concentration: 35.7%). The first half of the belt polymerization machine was cooled from the lower face of the belt with a cooling water of 12° C. Then, 12 minutes later, aqueous liquid, as supplied to the belt polymerization machine, exhibited the polymerization peak temperature of 85° C. The nitrogen gas was introduced at 3 m$^3$/h (670 cm/minute) from the same position as the supplying inlet of the aqueous liquid. The upper face of the dam of the belt polymerization machine was covered with a polyethylene film. However, on the inner face of the film, much dewfall occurred. The second half of the belt polymerization machine was heated for 12 minutes from the lower face of the belt with a hot water of 90° C.

The solid content of the obtained hydrogel polymer was 36.2%, and the increase in solid content was 0.5%. The hydrogel polymer was gel-pulverized in the same way as of Example 1 and then dried at 160° C. for 65 minutes. The dried product was pulverized and classified, thereby obtaining a water-absorbent resin (2) of 500~106 μm.

The absorption capacity and the water-soluble content of the water-absorbent resin (2), as measured by the above-mentioned method, were 70 g/g and 4% respectively.

EXAMPLE 3

A water-absorbent resin (3) was obtained in the same way as of Example 1 except that the supplying amount of the nitrogen gas during the polymerization was 1 L/minute (18 cm/minute). The polymerization peak temperature of 95° C. was exhibited 12 minutes after injecting the polymerization initiators. The increase in solid content was 0.2%.

The absorption capacity and the water-soluble content of the water-absorbent resin (3), as measured by the above-mentioned method, were 68 g/g and 8% respectively.

EXAMPLE 4

A water-absorbent resin (4) was obtained in the same way as of Example 1 except that only 800 g of the prepared aqueous liquid was injected into the stainless vessel to set the thickness of the aqueous liquid to be 10 mm. The polymerization peak temperature of 60° C. was exhibited 15 minutes after injecting the polymerization initiators. The increase in solid content was 0.2%.

The absorption capacity and the water-soluble content of the water-absorbent resin (4), as measured by the above-mentioned method, were 55 g/g and 3% respectively.

EXAMPLE 5

First of all, 170 g of acrylic acid and 1808 g of a 37% aqueous sodium acrylate solution as monomers, 1.36 g of polyethylene glycol diacrylate (average molecular weight 478) as a crosslinking agent, and 407 g of water were sufficiently mixed to prepare an aqueous liquid. The obtained aqueous liquid was placed into a stainless vessel which had a size of length 320 mm×width 220 mm×height 50 mm and of which the inner surface was Teflon-coated. At that time, the thickness of the aqueous liquid was 30 mm. The stainless vessel was sealed at its upper side with a polyethylene film which had a nitrogen introducing inlet, an exhaust outlet and a polymerization initiator injecting inlet, and then the vessel was dipped into a water bath of 30° C. Dissolved oxygen was removed from the aqueous liquid by introducing a nitrogen gas into the aqueous liquid while adjusting the temperature of the aqueous liquid to 30° C. Thereafter, the nitrogen gas was introduced at 10 L/minute (180 cm/minute) in the length direction of the vessel, while the exhaust was continued from the opposite side. Then, 0.02 g/(monomer mol) of V-50, 0.0018 g/(monomer mol) of L-ascorbic acid and 0.0014 g/(monomer mol) of hydrogen peroxide, which were respectively dissolved in 5 g of deaerated water, were injected as polymerization initiators and sufficiently mixed with a magnetic stirrer (monomer concentration: 35 %). Because the polymerization got started 1 minute after the injection of the polymerization initiators, the stainless vessel was dipped into a water bath of 10° C. up to the height of 10 mm from the bottom of the vessel, and the upper part of the polyethylene film was covered with a heat insulator. After 13 minutes, the polymerization peak temperature of 84 ° C. was exhibited. Water vapor that came out of the exhaust outlet in that polymerization period of 12 minutes was trapped and was found to be 102 g. After the polymerization peak, the stainless vessel was dipped in a water bath of 80° C. up to the height of 10 mm from the bottom of the vessel and held for 60 minutes.

The obtained hydrogel polymer was pulverized with a meat chopper (No. 32 type chopper made by Hiraga Kosakusho & Co., Ltd.) having a perforated plate (dice) containing holes of a diameter of 9.5 mm and then dried at 160° C. for 65 minutes. The dried product was pulverized and classified, thereby obtaining a water-absorbent resin (5) of 500~106 μm. The solid content of the pulverized gel was 36.5%, and the increase in solid content was 1.5%.

The absorption capacity and the water-soluble content of the water-absorbent resin (5), as measured by the above-mentioned method, were 70 g/g and 5% respectively.

EXAMPLE 6

First of all, 204 g of acrylic acid, 1339 g of a 37% aqueous sodium acrylate solution, 1.58 g of polyethylene glycol diacrylate (average molecular weight 478), and 442 g of deionized water were sufficiently mixed to prepare an aqueous liquid. The obtained aqueous liquid was supplied into a reactor comprising: a cap which was equipped with a thermometer, a gas introducing tube on the inlet side in the length direction, and an exhaust outlet on the outlet side in the length direction, covered with a heat insulator; and a vessel with a bottom face of 320 mm×220 mm and a depth of 60 mm, and this reactor was immersed into a water bath of 20° C. A nitrogen gas was introduced into the aqueous liquid to decrease the amount of dissolved oxygen to about 0.3 ppm. Then, this introduction of the nitrogen gas into the reactor was continued at 8 L/minute (103 cm/minute). Next, 3.24 g of a 5% aqueous solution of V-50 (azo-based polymerization initiator made by Wako Pure Chemical Industries, Ltd.), 3.24 g of a 5% aqueous sodium persulfate solution, and 2.92 g of a 1% aqueous L-ascorbic acid solution were added and mixed, and then 3.34 g of a 0.35% aqueous hydrogen peroxide solution was added and mixed. The monomer concentration was 35%, and the thickness of the aqueous liquid was 25 mm. Polymerization got started 1 minute after the addition of hydrogen peroxide. After the initiation of the polymerization, the reactor was immersed into a water bath of 10° C. up to the height of 10 mm from the bottom. After 12 minutes, the central portion of the polymerization system (polymer+unreacted monomer) in the thickness direction reached the maximum temperature of 80° C. (polymerization peak temperature), when the temperature of the polymerization system on the bottom side of the reactor was 62° C. and the temperature of the polymerization system on its upper side was 66° C. After the polymerization peak, the temperature of the water bath was changed to 60° C. and kept at this temperature for 60 minutes, thereby obtaining a hydrogel polymer. This hydrogel polymer was pulverized with a meat chopper, and the resultant pulverized gel was dried with hot air of 160° C. for 65 minutes. The solid content of the pulverized gel was 35.8%, and the increase in solid content was 0.8%. The resultant dried product was pulverized and classified, thereby obtaining a water-absorbent resin (6) of 500~106 μm.

The absorption capacity and the water-soluble content of the water-absorbent resin (6), as measured by the above-mentioned method, were 65 g/g and 3% respectively.

One hundred parts of the water-absorbent resin (6), 0.1 parts of ethylene glycol diglycidyl ether, 4 parts of water, and 1 part of isopropyl alcohol were uniformly mixed, and the resultant mixture was heated at 195° C. for 40 minutes, thereby obtaining a water-absorbing agent. With this water-absorbing agent, the absorption capacity was measured by the above-mentioned method, and further the absorption capacity under high load and the absorption speed were measured by a method as disclosed in JP-A-09-235378. As a result, the absorption capacity was 50 g/g, the absorption capacity under high load was 28 g/g, and the absorption speed was 20 seconds.

EXAMPLE 7

First of all, 100 parts of acrylic acid, 656.4 parts of a 37% aqueous sodium acrylate solution, 0.77 parts of polyethylene glycol diacrylate (average molecular weight 478), and 216.7 parts of deionized water were sufficiently mixed to prepare an aqueous monomer liquid. The obtained aqueous monomer liquid was supplied at 71.2 kg/h to a steel-made belt polymerization machine having a width of 30 cm and moving at 14 cm/min. The aqueous monomer liquid was supplied from a tank through plumbing to the belt polymerization machine by using a metering pump, and a nitrogen gas was continuously introduced on the way of the plumbing, thereby decreasing the amount of dissolved oxygen to 0.5 ppm or below. Furthermore, a 10% aqueous solution of V-50 (azo-based polymerization initiator made by Wako Pure Chemical Industries, Ltd.), a 10% aqueous sodium persulfate solution, and an aqueous L-ascorbic acid solution were supplied to the aqueous monomer liquid and mixed on the line such that V-50 would be 0.02 g/(monomer mol), sodium persulfate would be 0.02 g/(monomer mol), and L-ascorbic acid would be 0.0018 g/(monomer mol). Finally, a 0.35% aqueous hydrogen peroxide solution was supplied to and mixed with the aqueous monomer liquid on the line such that hydrogen peroxide would be 0.00144 g/(monomer mol), and thus supplied to the belt polymerization machine. The temperature of the aqueous liquid, comprising the above aqueous monomer liquid and the above polymerization initiators, was controlled on the supplying line so as to be 20° C. In the belt polymerization machine with a dam of 50 mm in height, the above aqueous liquid was filled up to the height of 25 mm. The upper face of the belt polymerization machine was covered with a stainless food, and the polymerization was carried out under airtight conditions. The first half, 12 minutes in duration, of the belt polymerization machine was cooled from the lower face of the belt with a cooling water of 12° C. Then, 8 minutes later, the aqueous liquid, as supplied to the belt polymerization machine, exhibited the polymerization peak temperature of 86° C. The nitrogen gas was introduced at 700 cm/minute from the supplying side of the aqueous liquid to the upper portion of the belt polymerization machine. The ambient gas was discharged from downstream of the aqueous liquid supplying inlet by 1.4 m and allowed to contact a condenser of 12° C., whereby the water content in the gas was condensed. The ambient gas from which the condensed water was removed was combined with a fresh nitrogen gas near the aqueous liquid supplying inlet and then recycled to the polymerization machine. On the other hand, acrylic acid comprised about 3% of the condensed water. Thus the condensed water was recycled to the starting aqueous liquid, when the concentration of the aqueous monomer liquid was kept at 35.1% by adding the starting material. The second half of the belt polymerization machine was heated for 12 minutes from the lower face of the belt with a warm water of 60° C.

The solid content of the resultant hydrogel polymer was 35.9%, and the increase in solid content was 0.8%. The hydrogel polymer was gel-pulverized in the same way as of Example 1 and then dried at 160° C. for 65 minutes. The dried product was pulverized and classified, thereby obtaining a water-absorbent resin (7) of 500~106 μm.

The absorption capacity and the water-soluble content of the water-absorbent resin (7), as measured by the above-mentioned method, were 66 g/g and 3% respectively.

COMPARATIVE EXAMPLE 1

In Example 1, the aqueous liquid, of which the dissolved oxygen level was decreased and into which the polymerization initiators were injected, was fully filled into a polyethylene bag so as to have no space portion, and the bag was then placed on the same vessel as used in Example 1. The subsequent operation was carried out in the same way as of Example 1. As a result, the polymerization peak temperature of 104° C. was exhibited 13 minutes after injecting the polymerization initiators.

The obtained hydrogel polymer was pulverized with a meat chopper (No. 32 type chopper made by Hiraga Kosakusho & Co., Ltd.) having a perforated plate (dice) containing holes of a diameter of 9.5 mm and then dried at 160° C. for 65 minutes. The solid content of the pulverized gel was 35.0%, and the increase in solid content was 0%. The dried product was pulverized and classified, thereby obtaining a comparative water-absorbent resin (1) of 500~106 μm.

The absorption capacity and the water-soluble content of the comparative water-absorbent resin (1), as measured by the above-mentioned method, were 70 g/g and 12% respectively.

COMPARATIVE EXAMPLE 2

The same operation as of Example 1 was repeated except that the vessel was not dipped into the water bath for cooling, but left in the air in the period of from the initiation of the polymerization till the exhibition of the polymerization peak temperature. Ten minutes after injecting the polymerization initiators, the boiling occurred at 110° C. or above.

The obtained hydrogel polymer was pulverized with a meat chopper (No. 32 type chopper made by Hiraga Kosakusho & Co., Ltd.) having a perforated plate (dice) containing holes of a diameter of 9.5 mm and then dried at 160° C. for 65 minutes. The solid content of the pulverized gel was 38.5%, and the increase in solid content was 3.5%. The dried product was pulverized and classified, thereby obtaining a comparative water-absorbent resin (2) of 500~106 μm.

The absorption capacity and the water-soluble content of the comparative water-absorbent resin (2), as measured by the above-mentioned method, were 71 g/g and 15% respectively.

COMPARATIVE EXAMPLE 3

An aqueous liquid was prepared in the same way as of Example 1 except that the amount of water was changed from 388 g to 14.3 g. Then, 564 g of the obtained aqueous liquid was injected into the same vessel as that used in Example 1, when the thickness was 7 mm (monomer concentration: 43.0%). Thereafter, the same procedure as of Example 1 was carried out to initiate the polymerization. After the initiation of the polymerization, the vessel was taken out of the water bath, and the polyethylene film was put off from the upper portion of the vessel, and the vessel was left in the air. Four minutes later than the initiation of the polymerization, the aqueous liquid boiled at 110° C. or higher. Thereafter, the same procedure as of Example 1 was carried out to obtain a comparative water-absorbent resin (3). The increase in solid content was 11.2%.

The absorption capacity and the water-soluble content of the comparative water-absorbent resin (3), as measured by the above-mentioned method, were 45 g/g and 10% respectively.

As to the water-absorbent resins (1)-(7) and the comparative water-absorbent resins (1)-(3) as obtained in Example 1~7 and Comparative Example 1~3 respectively, the absorption capacities and the water-soluble contents are shown in Table 1.

TABLE 1

| | | Absorption capacity (g/g) | Water-soluble content (wt %) |
|---|---|---|---|
| EXAMPLE 1 | Water-absorbent resin (1) | 68 | 4 |
| EXAMPLE 2 | Water-absorbent resin (2) | 70 | 4 |
| EXAMPLE 3 | Water-absorbent resin (3) | 68 | 8 |
| EXAMPLE 4 | Water-absorbent resin (4) | 55 | 3 |
| EXAMPLE 5 | Water-absorbent resin (5) | 70 | 5 |
| EXAMPLE 6 | Water-absorbent resin (6) | 65 | 3 |
| EXAMPLE 7 | Water-absorbent resin (7) | 66 | 3 |
| COMPARATIVE EXAMPLE 1 | Comparative water-absorbent resin (1) | 70 | 12 |
| COMPARATIVE EXAMPLE 2 | Comparative water-absorbent resin (2) | 71 | 15 |

TABLE 1-continued

| | | Absorption capacity (g/g) | Water-soluble content (wt %) |
|---|---|---|---|
| COMPARATIVE EXAMPLE 3 | Comparative water-absorbent resin (3) | 45 | 10 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A static polymerization production process for producing a water-absorbent resin, with the static polymerization production process taking place in a polymerization apparatus, with the polymerization apparatus comprising a contact face, with the polymerization apparatus including a polymerization system, with the polymerization system comprising an aqueous solution and resultant hydrogel polymer after the start of polymerization in the aqueous solution, with the polymerization system being in contact with the contact face of the polymerization apparatus, with the static polymerization process comprising the steps of:

a) polymerizing statically the aqueous solution, wherein the aqueous solution has a thickness of 10–50 mm, and wherein the aqueous solution includes a hydrophilic monomer to obtain the hydrogel polymer; and b) controlling the maximum attained temperature of the polymerization system in a range of 60–95° C. by drawing a given amount of heat away from the polymerization system, with the step of drawing a given amount of heat away from the polymerization system comprising the steps of:

i) drawing heat from the polymerization system via the step of applying a heat conductive process to the contact face of the polymerization apparatus; and ii) drawing heat from the polymerization system via the step of conveying an inert gas into and out of the polymerization apparatus to draw out the latent heat of vaporization, with an amount of the inert gas being conveyed into and out of the polymerization apparatus being in excess of that which is required to prevent oxygen from entering the polymerization apparatus.

2. A static polymerization production process for producing a water-absorbent resin, with the static polymerization production process taking place in a polymerization apparatus, with the polymerization apparatus comprising a contact face, with the polymerization apparatus including a polymerization system, with the polymerization system comprising an aqueous solution and resultant hydrogen polymer after the start of polymerization in the aqueous solution, with the polymerization system being in contact with the contact face of the polymerization apparatus, with the static polymerization process comprising the steps of:

a) polymerizing statically the aqueous solution, wherein the aqueous solution has a thickness of 10–50 mm, wherein the aqueous solution includes a hydrophilic monomer; and b) controlling an increase in solid content of the polymerization system by drawing a given amount of heat away from the polymerization system, with the step of drawing a given amount of heat away from the polymerization system comprising the steps of:

i) drawing heat from the polymerization system via the step of applying a heat conductive process to the contact face of the polymerization apparatus; and ii) drawing heat from the polymerization system via the step of conveying an inert gas into and out of the polymerization apparatus to draw out the latent heat of vaporization, with an amount of the inert gas being conveyed into and out of the polymerization apparatus being in excess of that which is required to prevent oxygen from entering the polymerization apparatus.

3. A static polymerization production process for producing a water-absorbent resin according to claim 1, wherein a flow of inert gas into and out of the polymerization apparatus is 30 cm/min or more.

4. A static polymerization production process for producing a water-absorbent resin according to claim 1, wherein the step of drawing an inert gas into and out of the polymerization apparatus to draw out the latent heat of vaporization comprises the step of permitting water vapor and vaporized hydrophilic monomer to condense.

5. A static polymerization production process for producing a water-absorbent resin according to claim 1, wherein the step of conveying an inert gas into and out of the polymerization apparatus comprises permitting water vapor and vaporized hydrophilic monomer to condense into a hydrophilic monomer aqueous solution after the inert gas has been conveyed out of the polymerization apparatus, and further comprising the step of introducing at least part of said hydrophilic monomer solution back into a starting hydrophilic monomer aqueous solution.

6. A static polymerization production process for producing a water-absorbent resin according to claim 2, wherein a flow of inert gas through the polymerization apparatus is 30 cm/min or more.

7. A static polymerization production process for producing a water-absorbent resin according to claim 2, wherein the step of drawing an inert gas into and out of the polymerization apparatus to draw out the latent heat of vaporization comprises the step of permitting water vapor and vaporized hydrophilic monomer to condense.

8. A static polymerization production process for producing a water-absorbent resin according to claim 3, wherein the step of drawing an inert gas into and out of the polymerization apparatus to draw out the latent heat of vaporization comprises the step of permitting water vapor and vaporized hydrophilic monomer to condense.

9. A static polymerization production process for producing a water-absorbent resin according to claim 2, wherein the step of conveying a inert gas into and out of the polymerization apparatus comprises permitting water vapor and vaporized hydrophilic monomer to condense into a hydrophilic monomer aqueous solution after the inert gas has been conveyed out of the polymerization apparatus, and further comprising the step of introducing at least part of said hydrophilic monomer solution back into a starting hydrophilic monomer aqueous solution.

10. A static polymerization production process for producing a water-absorbent resin according to claim 3, wherein the step of conveying an inert gas into and out of the polymerization apparatus comprises permitting water vapor and vaporized hydrophilic monomer to condense into a hydrophilic monomer aqueous solution after the inert gas has been conveyed out of the polymerization apparatus, and further comprising the step of introducing at least part of said hydrophilic monomer solution back into a starting hydrophilic monomer aqueous solution.

11. A static polymerization production process for producing a water-absorbent resin according to claim 4, wherein the step of conveying an inert gas into and out of the polymerization apparatus comprises permitting water vapor and vaporized hydrophilic monomer to condense into a hydrophilic monomer aqueous solution after the inert gas has been conveyed out of the polymerization apparatus, and further comprising the step of introducing at least part of said hydrophilic monomer solution back into a starting hydrophilic monomer aqueous solution.

12. A static polymerization production process for producing a water-absorbent resin according to claim 1, wherein the hydrogel polymer obtained by said static polymerization production process is pulverized to obtain a particulate hydrogel polymer having an average particle diameter of about 1 to about 10 mm that is then dried.

13. A static polymerization production process for producing a water-absorbent resin according to claim 12, wherein said particulate hydrogel polymer is dried until the solid content of said particulate hydrogel polymer increases to 70 to 100 weight %.

14. A static polymerization production process for producing a water-absorbent resin according to claim 12, wherein said particulate hydrogel polymer is dried until the solid content of said particulate hydrogel polymer increases to 80 to 98 weight %.

15. A static polymerization production process for producing a water-absorbent resin according to claim 13, wherein said particulate hydrogel polymer which is dried is further pulverized and classified to obtain a particulate water-absorbent resin having a particle size in the range of 100 $\mu$m to 1 mm.

16. A static polymerization production process for producing a water-absorbent resin according to claim 13, wherein said particulate hydrogel polymer which is dried is further pulverized and classified to obtain a particulate water-absorbent resin having a particle size in the range of 150 $\mu$m to 800 $\mu$m.

17. A static polymerization production process for producing a water-absorbent resin according to claim 15, wherein a vicinity of the surface of said particulate water-absorbent resin is further subjected to a crosslinking treatment.

18. A static polymerization production process for producing a water-absorbent resin according to claim 2, wherein the hydrogel polymer obtained by said static polymerization production process is pulverized to obtain a particulate hydrogel polymer having an average particle diameter of about 1 to about 10 mm that is then dried.

19. A static polymerization production process for producing a water-absorbent resin according to claim 18, wherein said particulate hydrogel polymer is dried until the solid content of said particulate hydrogel polymer increases to 70 to 100 weight %.

20. A static polymerization production process for producing a water-absorbent resin according to claim 18, wherein said particulate hydrogel polymer is dried until the solid content of said particulate hydrogel polymer increases to 80 to 98 weight %.

21. A static polymerization production process for producing a water-absorbent resin according to claim 19, wherein said particulate hydrogel polymer which is dried is further pulverized and classified to obtain a particulate water-absorbent resin having a particle size in the range of 150 $\mu$m to 800 $\mu$m.

22. A static polymerization production process for producing a water-absorbent resin according to claim 20, wherein a vicinity of the surface of said particulate water-absorbent resin is further subjected to a crosslinking treatment.

23. A static polymerization production process for producing a water-absorbent resin according to claim 1, further comprising the steps of
   a) conveying the inert gas into and out of the polymerization apparatus and further conveying out vapor with the inert gas, with the vapor including water vapor and monomer vapor;
   b) condensing water and monomer from the inert gas conveyed out of the polymerization apparatus; and
   c) introducing the inert gas, which has been conveyed from the polymerization apparatus and from which water and monomer have been condensed, back into the polymerization apparatus.

24. A static polymerization production process for producing a water-absorbent resin according to claim 2, further comprising the steps of:
   a) conveying the inert gas into and out of the polymerization apparatus and further conveying out vapor with the inert gas, with the vapor including water vapor and monomer vapor;
   b) condensing water and monomer from the inert gas conveyed out of the polymerization apparatus; and
   c) introducing the inert gas, which has been conveyed from the polymerization apparatus and from which water and monomer have been condensed, back into the polymerization apparatus.

25. A static polymerization production process for producing a water-absorbent resin according to claim 1, wherein a thickness of the aqueous solution is 15–35 mm.

26. A static polymerization production process for producing a water-absorbent resin according to claim 2, wherein a thickness of the aqueous solution is 15–35 mm.

27. A static polymerization production process for producing a water-absorbent resin according to claim 1, wherein the maximum attained temperature of the polymerization system is controlled in the range of 70–90° C.

28. A static polymerization production process for producing a water-absorbent resin according to claim 2, and further comprising the step of controlling a maximum attained temperature of the polymerization system by said step of drawing a given amount of heat away from the polymerization system, wherein the maximum attained temperature of the polymerization system is controlled in the range of 60–95° C.

29. A static polymerization production process for producing a water-absorbent resin according to claim 28, wherein the maximum attained temperature of the polymerization system is controlled in the range of 70–90° C.

30. A static polymerization production process for producing a water-absorbent resin according to claim 1, wherein a flow of the inert gas through the polymerization apparatus is in the range of 30–6000 cm/min.

31. A static polymerization production process according to claim 2, wherein the increase in solid content is held to the range of 0.2 to 10 weight percent, and further comprising the step of determining the increase in solid content, with the step of determining the increase in solid content comprising the steps of:
   a) determining a concentration by weight of the hydrophilic monomer in the aqueous solution prior to polymerization to obtain a first value in weight percent;

b) determining a concentration by weight of solid content in the water-absorbent resin after polymerization and prior to drying to obtain a second value in weight percent; and c) determining a weight percent increase by subtracting the first value from the second value to obtain a third value in weight percent, with the third value being in said range of 0.2 to 10 weight percent.

32. A static polymerization production process for producing a water-absorbent resin according to claim 1, and further comprising the step of providing a space above the polymerization system, with said space being in the polymerization apparatus, with a flow of inert gas through the polymerization apparatus being directed through said space to thereby carry away water vapor and monomer vapor.

33. A static polymerization production process for producing a water-absorbent resin according to claim 2, and further comprising the step of providing a space above the polymerization system, with said space being in the polymerization apparatus, with a flow of inert gas through the polymerization apparatus being directed through said space to thereby carry away water vapor and monomer vapor.

34. A static polymerization production process for producing a water-absorbent resin according to claim 1, and wherein polymerization of the hydrophilic monomer is carried out without stirring the aqueous solution from a time that polymerization is initiated to a time that the aqueous solution reaches a maximum attained temperature and is a gel.

35. A static polymerization production process for producing a water-absorbent resin according to claim 2, and wherein polymerization of the hydrophilic monomer is carried out without stirring the aqueous solution from a time that polymerization is initiated to a time that the aqueous solution reaches a maximum attained temperature and is a gel.

36. A static polymerization production process for producing a water-absorbent resin according to claim 1, and wherein the step of conveying a gas into and out of the polymerization apparatus is effective to contribute 20–60% to said given amount of heat that is drawn away from the polymerization system.

37. A static polymerization production process for producing a water-absorbent resin according to claim 2, and wherein the step of conveying a gas into and out of the polymerization apparatus is effective to contribute 20–60% to said given amount of heat that is drawn away from the polymerization system.

38. A static polymerization production process for producing a water-absorbent resin according to claim 19, wherein said particulate hydrogel polymer which is dried is further pulverized and classified to obtain a particulate water-absorbent resin having a particle size in the range of 100 µm to 1 mm.

39. A static polymerization production process for producing a water-absorbent resin, with the static polymerization production process taking place in a polymerization apparatus, with the polymerization apparatus comprising a contact face, with the polymerization apparatus including a polymerization system, with the polymerization system comprising an aqueous solution and resultant hydrogel polymer after the start of polymerization in the aqueous solution, with the polymerization system being in contact with tne contact face of the polymerization apparatus, with the static polymerization process comprising the steps of:

a) polymerizing statically the aqueous solution, wherein the aqueous solution has a thickness of 10–50 mm, and wherein the aqueous solution includes a hydrophilic monomer to obtain the hydrogel polymer;

b) controlling the maximum attained temperature of the polymerization system in a range of 60–95° C. by drawing a given amount of heat away from the polymerization system, with the step of drawing a given amount of heat away from the polymerization system comprising the steps of:

i) drawing heat from the polymerization system via the step of applying a heat conductive process to the contact face of the polymerization apparatus; and ii) drawing heat from the polymerization system via the step of conveying an inert gas into and out of the polymerization apparatus to draw out the latent heat of vaporization, with an amount of the inert gas being conveyed into and out of the polymerization apparatus being in excess of that which is required to prevent oxygen from entering the polymerization apparatus;

c) pulverizing the hydrogel polymer obtained by said static polymerization production process to obtain a particulate hydrogel polymer having an average particle diameter of about 1 to about 10 mm;

d) drying the particulate hydrogel polymer until the solid content of said particulate hydrogel polymer increases to 70 to 100 weight %; and e) further pulverizing the particulate hydrogel polymer after the step of drying the particulate hydrogel polymer and then classifying the particulate hydrogel polymer to obtain a particulate water-absorbent resin having a particle size in the range of 100 µm to 1 mm.

* * * * *